(12) United States Patent
Bowe et al.

(10) Patent No.: US 8,118,889 B2
(45) Date of Patent: *Feb. 21, 2012

(54) CATALYTIC REACTOR

(75) Inventors: Michael Joseph Bowe, Preston (GB);
David Leslie Segal, Abingdon (GB);
Clive Derek Lee-Tuffnell, Poole (GB);
David Charles William Blaikley,
Kenilworth (GB); Jason Andrew
Maude, Cheadle (GB); John William
Stairmand, Chester (GB); Ian
Frederick Zimmerman, Wimborne
(GB)

(73) Assignee: CompactGTL plc, Abingdon,
Oxfordshire (GB)

( * ) Notice: Subject to any disclaimer, the term of this patent is extended or adjusted under 35 U.S.C. 154(b) by 1843 days.

This patent is subject to a terminal disclaimer.

(21) Appl. No.: 10/483,594

(22) PCT Filed: Jul. 9, 2002

(86) PCT No.: PCT/GB02/03147
§ 371 (c)(1),
(2), (4) Date: Jan. 20, 2004

(87) PCT Pub. No.: WO03/006149
PCT Pub. Date: Jan. 23, 2003

(65) Prior Publication Data
US 2006/0076127 A1    Apr. 13, 2006

(30) Foreign Application Priority Data

Jul. 11, 2001 (GB) .................................. 0116894.7

(51) Int. Cl.
B01J 7/00 (2006.01)
B01J 19/00 (2006.01)
B01J 8/02 (2006.01)
C10K 3/06 (2006.01)
F01N 3/10 (2006.01)
B01D 50/00 (2006.01)

(52) U.S. Cl. .............. 48/61; 48/211; 422/173; 422/177; 422/198; 422/211

(58) Field of Classification Search .................. 422/173, 422/177, 198, 211; 48/211
See application file for complete search history.

(56) References Cited

U.S. PATENT DOCUMENTS 1,662,870 A   3/1928   Stancliffe ...................... 165/166
(Continued)

FOREIGN PATENT DOCUMENTS

DE    3926466    2/1991
(Continued)

OTHER PUBLICATIONS

Certified Translation of EP0885653A2 (Dec. 2007).*

(Continued)

Primary Examiner — Matthew Merkling
(74) Attorney, Agent, or Firm — McDermott Will & Emery LLP

(57) ABSTRACT

A catalytic reactor (40) comprises a plurality of sheets (42) defining flow channels (44) between them. Within each flow channel (44) is a foil (46) of corrugated material whose surfaces are coated with catalytic material apart from where they contact the sheets (44). At each end of the reactor (40) are headers to supply gas mixtures to the flow channels (44), the headers communicating with adjacent channels being separate. The reactor (40) enables different gas mixtures to be supplied to adjacent channels (44), which may be at different pressures, and the corresponding chemical reactions are also different. Where one of the reactions is endothermic while the other reaction is exothermic, heat is transferred through the sheets (42) separating the adjacent channels (44), from the exothermic reaction to the endothermic reaction. The reactor (40) may be used in a compact plant to perform steam/methane reforming, obtaining the necessary heat by catalytic methane combustion, and also for Fischer-Tropsch synthesis, so that the overall process involves conversion of methane to long-chain hydrocarbons.

20 Claims, 4 Drawing Sheets

U.S. PATENT DOCUMENTS

| | | | | |
|---|---|---|---|---|
| 4,214,867 | A | | 7/1980 | Hunter ............... 432/29 |
| 4,601,999 | A | * | 7/1986 | Retallick et al. ............ 502/314 |
| 4,631,024 | A | * | 12/1986 | Shibata et al. ............ 431/268 |
| 4,653,581 | A | | 3/1987 | Yogo et al. ............ 165/166 |
| 4,815,534 | A | * | 3/1989 | Fuerschbach ............ 165/167 |
| 5,222,551 | A | * | 6/1993 | Hasegawa et al. ............ 165/167 |
| 5,250,489 | A | | 10/1993 | Betta et al. ............ 502/262 |
| 5,441,106 | A | * | 8/1995 | Yukitake ............ 165/183 |
| 5,534,328 | A | | 7/1996 | Ashmead ............ 428/166 |
| 5,621,155 | A | * | 4/1997 | Benham et al. ............ 585/310 |
| 5,670,269 | A | | 9/1997 | Hamada et al. |
| 5,681,538 | A | | 10/1997 | Sung |
| 5,744,104 | A | * | 4/1998 | Sakurai et al. ............ 422/174 |
| 5,753,194 | A | | 5/1998 | Heil et al. |
| 5,811,062 | A | | 9/1998 | Wegeng ............ 422/129 |
| 5,876,540 | A | * | 3/1999 | Pannell ............ 156/91 |
| 6,056,932 | A | * | 5/2000 | von Hippel et al. ............ 423/376 |
| 6,096,286 | A | * | 8/2000 | Autenrieth ............ 423/651 |
| 6,159,358 | A | * | 12/2000 | Mulvaney et al. ............ 208/46 |
| 6,187,273 | B1 | | 2/2001 | Gaiser |
| 6,200,536 | B1 | | 3/2001 | Tonkovich ............ 422/177 |
| 6,211,255 | B1 | * | 4/2001 | Schanke et al. ............ 518/715 |
| 6,284,217 | B1 | | 9/2001 | Wang ............ 423/651 |
| 6,440,895 | B1 | | 8/2002 | Tonkovich ............ 502/439 |
| 6,451,864 | B1 | | 9/2002 | Wang ............ 518/715 |
| 6,488,838 | B1 | | 12/2002 | Tonkovich ............ 208/108 |
| 7,172,735 | B1 | | 2/2007 | Lowe et al. |
| 7,186,388 | B2 | | 3/2007 | Bowe et al. |
| 7,201,883 | B2 | | 4/2007 | Bowe et al. |
| 7,300,635 | B2 | | 11/2007 | Bowe et al. |

FOREIGN PATENT DOCUMENTS

| | | | |
|---|---|---|---|
| EP | 0212878 | | 3/1987 |
| EP | 0292245 | | 11/1988 |
| EP | 305203 | | 3/1989 |
| EP | 0416710 | | 3/1991 |
| EP | 0430184 | | 6/1991 |
| EP | 885653 | A2 * | 12/1998 |
| GB | 1490977 | | 11/1977 |
| GB | 1531134 | | 11/1978 |
| GB | 1546097 | | 5/1979 |
| GB | 2354960 | | 4/2001 |
| JP | 56166937 | A | 12/1981 |
| WO | 9632188 | | 10/1996 |
| WO | 9632188 | A1 | 10/1996 |
| WO | 9801514 | A1 | 1/1998 |
| WO | 98/38147 | | 9/1998 |
| WO | 00/34728 | | 6/2000 |
| WO | 0034728 | | 6/2000 |
| WO | 01/10773 | | 2/2001 |
| WO | 01/12312 | | 2/2001 |
| WO | 01/12323 | | 2/2001 |
| WO | 01/12753 | | 2/2001 |
| WO | 0112753 | A1 | 2/2001 |
| WO | 0151194 | | 7/2001 |
| WO | 0200548 | | 1/2002 |
| WO | 02051538 | | 7/2002 |
| WO | 02/064248 | | 8/2002 |
| WO | 02/066371 | | 8/2002 |

OTHER PUBLICATIONS

UK Search Report (GB 0116894.7), dated Jan. 10, 2002.
PCT Search Report (PCT/GB 02/03147), dated Sep. 10, 2002.
PCT Written Opinion (PCT/GB 02/03147), dated Aug. 1, 2003.
PCT Examination Report (PCT/GB 02/03147), dated Sep. 3, 2003.
Chinese Examination Report (02817803.3), dated Oct. 28, 2005.

* cited by examiner

CATALYTIC REACTOR

This invention relates to a catalytic reactor suitable for use in performing gas phase reactions at elevated pressures, and particularly but not exclusively for performing highly exothermic and endothermic reactions, and also to a chemical process and plant using the catalytic reactor.

The use of catalytic material supported on a metal substrate is well known. For example GB 1 490 977 describes a catalyst comprising an aluminium-bearing ferritic alloy substrate, coated with a layer of a refractory oxide such as alumina, titania or zirconia, and then with a catalytic platinum-group metal. As described in GB 1 531 134 and GB 1 546 097, a catalyst body may comprise substantially flat sheets and corrugated sheets of such material arranged alternately so as to define channels through the body, either several such sheets arranged in a stack, or two such sheets wound together to form a coil. In these examples both the flat sheets and the corrugated sheets have small-scale corrugations superimposed upon them to help in the formation of the coating. Such catalyst bodies are described as being suitable for use in treating exhaust gas from vehicles. In this context heat transfer between one channel and an adjacent channel is not a consideration, as all the channels carry the same gases at the same pressures.

According to the present invention there is provided a catalytic reactor comprising a plurality of metal sheets arranged to define first gas flow channels between adjacent sheets, means to define second gas flow channels in proximity to the first gas flow channels, arranged so as to ensure good thermal contact between gases in the first and the second gas flow channels, and a permeable metal heat-transfer layer within each flow channel, and headers to supply gas mixtures to the gas flow channels, the headers being such that different gas mixtures can be supplied to the first and the second gas flow channels, the metal heat-transfer layer being removable and at least in the first gas flow channels incorporating a catalytic coating, and if the catalytic coating incorporates a ceramic layer, the coating being provided only on those surfaces of the heat-transfer layer that do not come into contact with the walls of the channel.

The second gas flow channels may also be defined between the metal sheets, first and second gas flow channels being defined alternately between successive such sheets. The second gas flow channels may also incorporate metal heat-transfer layers. This improves heat transfer. In each case the metal heat-transfer layer may comprise a non-planar metallic foil, or a metallic foam, mesh, fibre mat, or honeycomb, or a similar structure combining ceramic and metal, for example; it must be highly permeable to the gas flow. Typically a foil is suitable.

Although the flow channels are referred to as gas flow channels, this is not a restriction on the use of the reactor as a liquid may instead be passed through one or both sets of channels. For example where a desired catalytic reaction is exothermic, a heat transfer liquid (rather than a gas) may be passed through the other set of flow channels. Furthermore the second flow channels may not all carry the same fluid: for example two different fluids might be supplied to alternate second flow channels.

To ensure the required good thermal contact, both the first and the second gas flow channels are preferably less than 8 mm deep in the direction normal to the adjacent metal sheets. More preferably both the first and the second gas flow channels are less than 2 mm deep in this direction. The foils may be dimpled or corrugated.

For example the sheets might be concentric tubes, so that the gas flow channels are annular channels, each annular channel locating a generally cylindrical sheet of corrugated material, the surfaces of the sheets of corrugated material being coated with catalytic material. In this case the headers would be provided at each end of the tubes to supply gas mixtures to the annular channels, the headers communicating with adjacent channels being separate. To ensure good heat transfer between the corrugated sheets and the tubes, each tube is desirably a tight fit around the adjacent corrugated sheet. The tubes may be sufficiently thick-walled to withstand pressure differences, so that the different gas mixtures may be at different pressures.

Alternatively the sheets might be flat, with grooves machined or etched across their surfaces to define gas flow channels. The reactor might therefore comprise a stack of such flat plates sufficiently thick to withstand the necessary pressure difference, the grooves in adjacent plates following different paths. The grooves may be for example 20 mm wide, this width being determined by the pressure difference to which the sheet is exposed, each accommodating one or more corrugated foil of material coated with catalytic material. To ensure that the gas flow channels are gas tight the plates are desirably bonded together, but the foils are removable (for example through a header).

In use of the catalytic reactor, the fluid mixture supplied to one set of channels is different from the fluid mixture supplied to the adjacent channels, and the corresponding chemical reactions are also different. One of the reactions may be endothermic while the other reaction is exothermic. In that case heat is transferred through the wall of the tube or sheet separating the adjacent channels, from the exothermic reaction to the endothermic reaction. Alternatively there may be a chemical reaction in the first set of channels, while the fluid in the second flow channels merely acts as a heat transfer medium (either to supply heat, or to remove heat).

This reactor is particularly suitable for performing methane/steam reforming (which is an endothermic reaction, generating hydrogen and carbon monoxide), and the alternate channels might contain a methane/air mixture so that the exothermic oxidation reaction provides the necessary heat for the endothermic reforming reaction. For the oxidation reaction several different catalysts may be used, for example palladium, platinum or copper on a ceramic support; for example copper or platinum on an alumina support stabilised with lanthanum, cerium or barium, or palladium on zirconia, or more preferably palladium on a metal hexaaluminate such as magnesium, calcium, strontium, barium or potassium hexaaluminate. For the reforming reaction also several different catalysts may be used, for example nickel, platinum, palladium, ruthenium or rhodium, which may be used on ceramic coatings; the preferred catalyst for the reforming reaction is rhodium or platinum on alumina or stabilised alumina. The oxidation reaction may be carried out at substantially atmospheric pressure, while the reforming reaction may be carried out at elevated pressure, for example up to 2 MPa (20 atmospheres), more typically in the range 0 to 200 kPa above atmospheric pressure.

It will be appreciated that the materials of which the reactor are made are subjected to a severely corrosive atmosphere in use, for example the temperature may be as high as 900° C., although more typically around 850° C. The reactor may be made of a metal such as an aluminium-bearing ferritic steel, in particular of the type known as Fecralloy (trade mark) which is iron with up to 20% chromium, 0.5-12% aluminium, and 0.1-3% yttrium. For example it might comprise iron with 15% chromium, 4% aluminium, and 0.3% yttrium. When this metal is heated in air it forms an adherent oxide coating of alumina which protects the alloy against further oxidation; this oxide layer also protects the alloy against corrosion under conditions that prevail within for example a methane oxidation reactor or a steam/methane reforming reactor. Where this metal is used as a catalyst substrate, and is coated with a ceramic layer into which a catalyst material is incorporated, the alumina oxide layer on the metal is believed to bind with the oxide coating, so ensuring the catalytic material adheres to the metal substrate.

For some purposes the catalyst metal might instead be deposited directly onto the adherent oxide coating of the metal (without any ceramic layer).

Especially if the reactor is to be used for an endothermic reaction, it may be desirable to raise the temperature of the reactor to a desired operating temperature by direct electrical heating, passing electric current through the sheets that form the reactor. This would typically only be done initially, the heat subsequently being provided by an exothermic reaction carried out in the second gas flow channels or by hot gases (for example exhaust gases from an external combustion process such as a laminar flow burner).

Where the reactor is used for a process in which a liquid product is formed, for example Fischer-Tropsch synthesis, it may also be desirable to shape the corrugations so as to enhance liquid/gas separation. It may also be desirable to provide no catalyst in those parts of the foil that will be contacted by the liquid phase.

The invention will now be further and more particularly described, by way of example only, and with reference to the accompanying drawings in which.

Reactors of the invention may be used in a plant to perform a chemical process for converting methane to longer chain hydrocarbons. The first stage involves steam/methane reforming, that is to say the reaction:

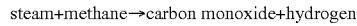

This reaction is endothermic, and may be catalysed by a rhodium catalyst in a first gas flow channel. The heat required to cause this reaction may be provided by combustion of methane, that is to say:

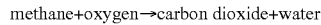

which is an exothermic reaction, and may be catalysed by a palladium catalyst in an adjacent second gas flow channel. Both these reactions may take place at atmospheric pressure, although alternatively the reforming reaction might take place at an elevated pressure. The heat generated by the combustion reaction would be conducted through the metal sheet separating the adjacent channels.

The gas mixture produced by the steam/methane reforming can then be used to perform a Fischer-Tropsch synthesis, that is to say:

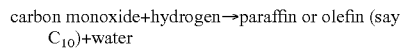

which is an exothermic reaction, occurring at an elevated temperature, typically between 200 and 350° C., for example 280° C., and an elevated pressure typically between 2 MPa and 4 MPa, for example 2.5 MPa, in the presence of a catalyst such as iron, cobalt or fused magnetite, with a potassium promoter. The exact nature of the organic compounds formed by the reaction depends on the temperature and the catalyst, as well as the ratio of carbon monoxide to hydrogen. The heat given out by this synthesis reaction may be used to provide at least part of the heat required by the steam/methane reforming reaction, for example a heat transfer fluid such as helium or Dowtherm A (trade mark of Dow Chemical) may be used to transfer the heat from a reactor in which the Fischer-Tropsch synthesis is occurring, the heat being used to preheat at least one of the gas streams supplied to the reforming reactor.

Figure 1:
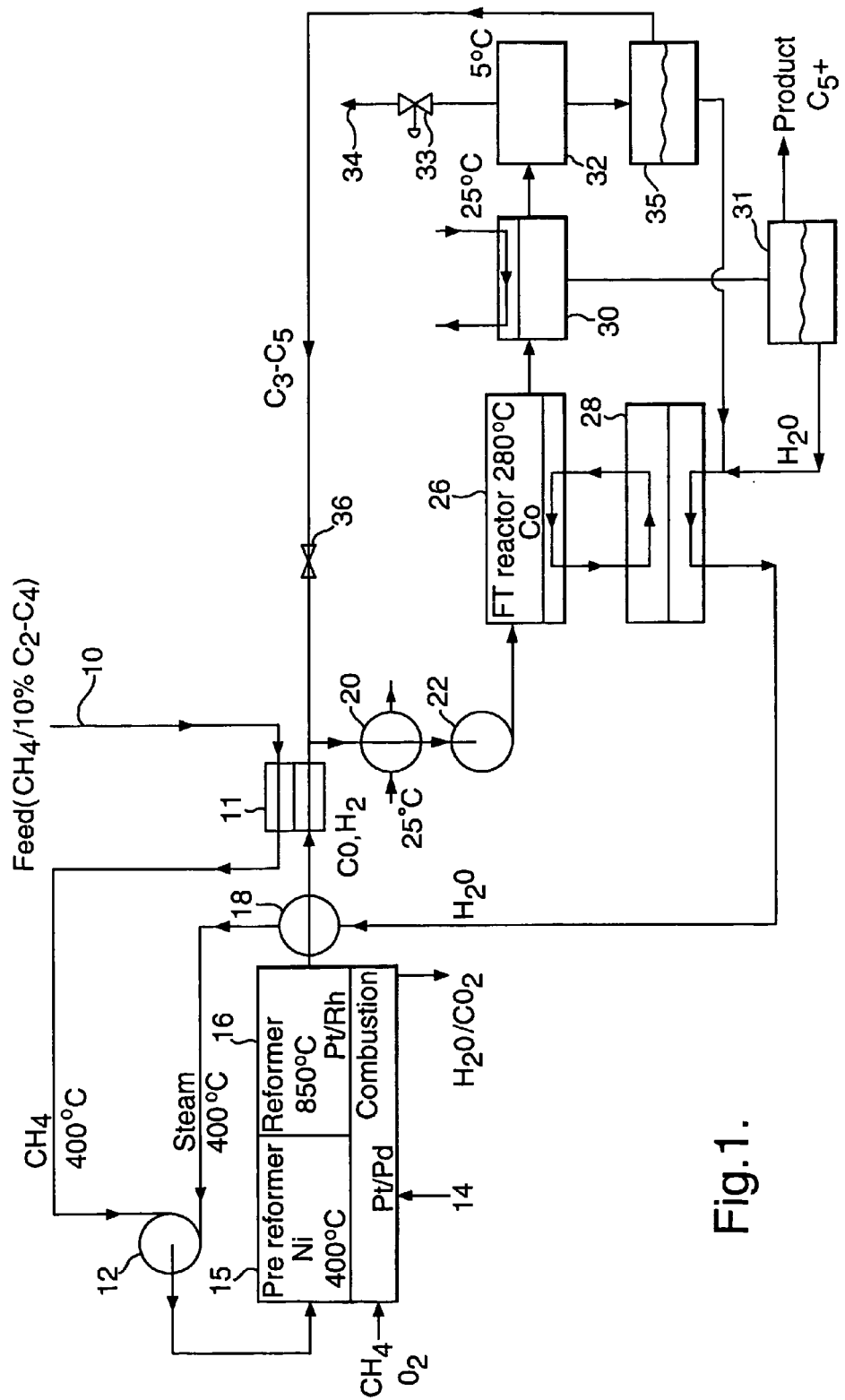
FIG. 1 shows a flow diagram of a chemical process that may be performed with one or more reactors of the invention.

Referring now to FIG. 1, the overall chemical process is shown as a flow diagram. The feed gas 10 consists primarily of methane, with a small percentage (say 10%) of ethane and propane. It is passed through a heat exchanger 11 so it is at about 400° C. and is then supplied via a fluidic vortex mixer 12 to a first catalytic reactor 14; in the mixer 12 the feed gas is mixed with a stream of steam that is also at about 400° C., the streams entering the mixer 12 through tangential inlets and following a spiral path to an axial outlet so they become thoroughly mixed. Both streams may be at atmospheric pressure, or for example at a pressure of say 100 kPa above atmospheric. The flows are preferably such that the steam: methane molar ratio is between 1:1 and 2:1. The first part of the reactor 14 is a pre-reformer 15 with a nickel methanation catalyst at 400° C., in which the higher alkanes react with the steam to form methane (and carbon monoxide); this pre-reformer 15 would not be required if the feed gas 10 contained substantially no higher alkanes. The second part of the reactor 14 is a reformer 16 with a platinum/rhodium catalyst, in which the methane and steam react to form carbon monoxide and hydrogen. This reaction may be performed at 850° C. The heat for the endothermic reactions may be provided by combustion of methane over a palladium or platinum catalyst within adjacent gas flow channels (as indicated), or alternatively from exhaust gases from an external combustion unit such as a laminar flow burner, the gases from the burner flowing in counter-current to the gas flow through the reformer 16; this can enable the reacting gases in the reformer 16 to reach a final temperature of as much as 1000° C. Where catalytic combustion is used, the catalyst may incorporate a metal hexaaluminate (such as magnesium hexaaluminate) as the substrate, which itself acts as catalyst at the high-temperature end, coated with say palladium which acts as the catalyst at the lower-temperature end, such that the temperature gradually increases from 400° C. to 850 or 950° C. The methane/oxygen mixture or methane may be supplied in stages along the reactor 14, to ensure combustion occurs throughout its length.

The hot mixture of carbon monoxide and hydrogen emerging from the reformer 16 is then quenched by passing through a heat exchanger 18 to provide the hot steam supplied to the vortex mixer 12, and then through the heat exchanger 11 in which it loses heat to the feed gas.

The mixture is then further cooled to about 100° C. by passing through a heat exchanger 20 cooled by water. The gases are then compressed through a compressor 22 to a pressure of 2.5 MPa.

The stream of high pressure carbon monoxide and hydrogen is then supplied to a catalytic reactor 26 in which they react, undergoing Fischer-Tropsch synthesis to form a paraffin or similar compound. This reaction is exothermic, preferably taking place at about 280° C., and the heat generated may be used to preheat the steam supplied to the heat exchanger 18, using a heat exchange fluid such as helium circulated between heat exchange channels in the reactor 26 and a steam generator 28. During this synthesis the volume of the gases decreases. The resulting gases are then passed into a condenser 30 in which they exchange heat with water initially at 25° C. The higher alkanes (say C5 and above) condense as a liquid, as does the water, this mixture of liquids being passed to a gravity separator 31; the separated higher alkanes can then be removed as the desired product, while the water is returned via the heat exchangers 28 and 18 to the mixer 12.

Any lower alkanes or methane, and remaining hydrogen, pass through the condenser 30 and are supplied to a refrigerated condenser 32 in which they are cooled to about 5° C. The gases that remain, consisting primarily of hydrogen, carbon dioxide, methane and ethane, may be passed through a pressure-releasing vent valve 33 to a flare 34. (Alternatively they might be fed into the combustion channel of the first catalytic reactor 14.) The condensed vapours, consisting primarily of propane, butane and water, are passed to a gravity separator 35, from which the water is combined with the recycled water from the separator 31, while the alkanes are recycled via a flow control valve 36 to the Fischer-Tropsch reactor 26.

When used in this fashion the overall result of the processes is that methane is converted to higher molecular weight hydrocarbons which are typically liquids at ambient temperatures. The processes may be used at an oil or gas well to convert methane gas into a liquid hydrocarbon which is easier to transport.

Figure 2:
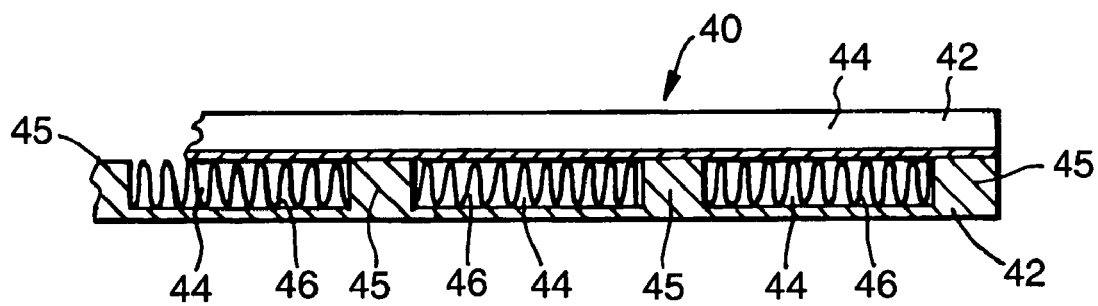
FIG. 2 shows a cross sectional view of a reactor.

Referring now to FIG. 2 a reactor 40 (suitable for example for use as the Fischer-Tropsch synthesis reactor 26) comprises a stack of plates 42 each of Fecralloy steel, the plates being 200 mm square and 3 mm thick (only parts of two plates are shown, in section, in the figure). Grooves 44 of width 8 mm and depth 2.5 mm extend across the entire width of each plate 42 parallel to one side, separated by lands 45 of width 3 mm, the grooves 44 being machined. A carrier foil 46 of Fecralloy steel 50 μm thick coated with a ceramic coating containing a catalyst material, and with corrugations 2.5 mm high, can be slid into each such groove 44, each such foil being devoid of ceramic coating and catalyst material on both of its surfaces along the crests and troughs of the corrugations. A stack of such plates 42 is assembled, the orientation of the grooves 44 differing by 90° in successive plates 42, and is covered with a flat top plate of Fecralloy steel; the stack is then diffusion bonded together. The corrugated foils are then inserted, the absence of ceramic coating at the top surface of the crests and the bottom surface of the troughs ensuring good thermal contact with the adjacent plates 42. Headers are then attached to the sides of the assembly. Thus the gas flow channels are defined by the grooves 44, one set of channels extending from say right to left in the stack, and the other set of channels (in the alternate plates 42) extending from front to back of the stack.

It will be understood that the type of ceramic deposited on the corrugated foils 46 in the gas flow channels may be different in successive plates 42 in the stack, and that the catalyst materials may differ also. For example the ceramic might comprise alumina in one of the gas flows channels, and zirconia in the other gas flow channels. The reactor 40 formed from the plates 42 would be also suitable for performing steam/methane reforming, for example using a rhodium catalyst. Because the plates 42 forming the stack are bonded together the gas flow channels are gas tight (apart from communication with headers at each end), and the dimensions of the plates 42 and grooves 44 are such that pressures in the alternate gas flow channels may be considerably different.

Particularly where the reactor 40 is to be used for Fischer-Tropsch synthesis, the gas flow channels 44 for that reaction may decrease in width, and possibly also depth, along their length, so as to vary the fluid flow conditions, and the heat or mass transfer coefficients. During the synthesis reaction the gas volume decreases, and by appropriate tapering of the channels 44 the gas velocity may be maintained as the reaction proceeds. Furthermore the pitch or pattern of the corrugated foils 46 may vary along a reactor channel 44 to adjust catalytic activity, and hence provide for control over the temperatures or reaction rates at different points in the reactor 40. The corrugated foils 46 may also be shaped, for example with perforations, to promote mixing of the fluid within the channels 44.

When a reactor such as the reactor 40 is used for reactions between gases that generate gaseous products then the orientation of the channels is not of concern. However if a product may be a liquid, it may be preferable to arrange the reactor 40 so that the flow paths for this reaction slope downwardly, to ensure that any liquid that is formed will drain out of the channels 44. The absence of catalyst material at the bottom of the troughs of the corrugations provides the advantage that methane formation is suppressed.

In a modification to the reactor 40, the foils are of titanium metal. This is coated with mixed oxides of cobalt and ruthenium (apart from along the crests and troughs) by a wet chemical process including sol-gel processing, dried, and then reduced to form fine metal particles of cobalt and ruthenium on the surface of the titanium foil. The reduction is carried out at a sufficiently low temperature that the particles do not sinter. Alternatively such a mixed oxide composition of cobalt and ruthenium may be deposited in combination with an alumina sol, or a titania sol; this is then reduced (the alumina or titania preventing the cobalt and ruthenium from sintering down) so as to produce small particles of cobalt and ruthenium metal; and the alumina or titania is then dissolved chemically. In yet another alternative the cobalt and ruthenium may be deposited directly onto titanium by chemical vapour deposition, or electrolytically in the form of small dendrites, so that a highly porous cobalt and ruthenium surface deposition is produced.

In a different modification to the reactor 40, the foils 42 are again of Fecralloy material, but the catalyst material is deposited directly onto the oxide layer of the Fecralloy.

Figure 3:
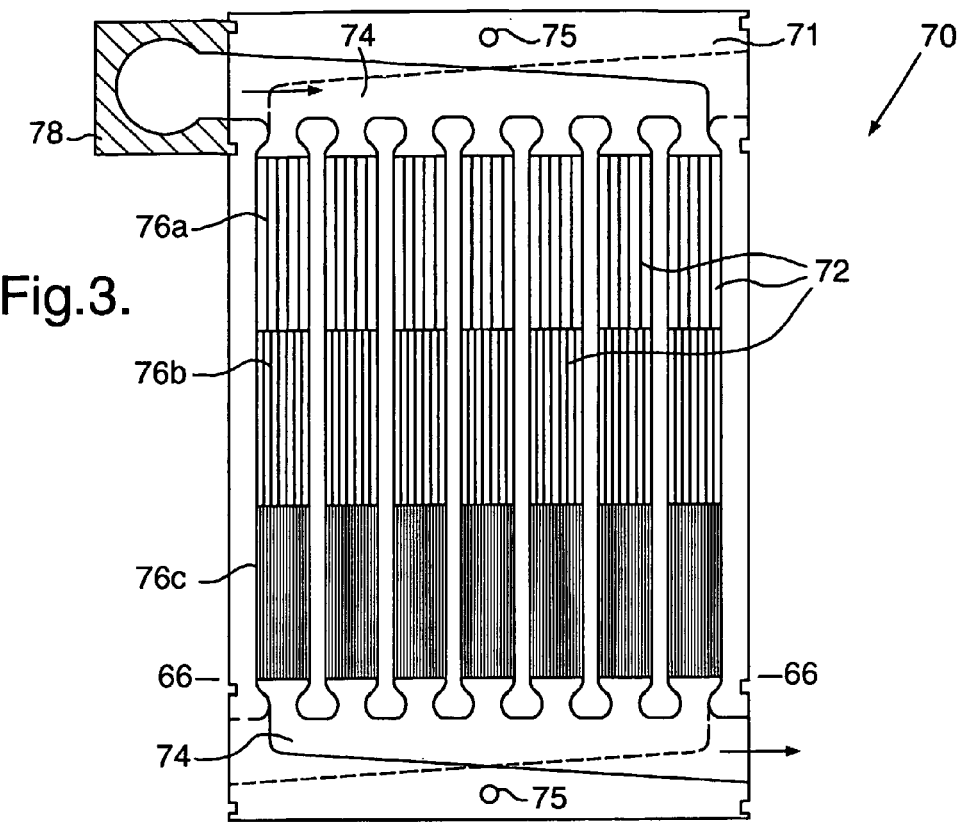
FIG. 3 shows a plan view of a plate which can be stacked to form an alternative catalytic reactor.

Referring now to FIG. 3, an alternative reactor 70 comprises a stack of Fecralloy steel plates 71, each plate being generally rectangular, 125 mm long and 82 mm wide and 2 mm thick. Along the centre portion of each plate 71, seven parallel rectangular grooves 72 are machined, each of depth 0.75 mm, with a header groove 74 of the same depth at each end, the header groove 74 extending to one side edge of the plate 71. On the top surface of the plate 71 shown in the figure the header groove 74 at the bottom end extends to the right hand edge of the plate 71, while that at the top end extends to the left hand edge of the plate 71. The grooves on the opposite surface of the plate 71 are identical but the headers (indicated in broken lines) extend to opposite sides of the plate 71. Successive plates 71 have their header grooves 74 in mirror image arrangements, so the adjacent grooves 74 extend to the same side of the stack. Within each rectangular groove 72 are three corrugated Fecralloy foils 76 a, b and c, each 50 μm thick and with its corrugations 1.5 mm high, but differing in the pitch or wavelength of their corrugations. As in the reactor 40 the foils 76 are not coated in ceramic (or catalyst) on either surface at the crests and the troughs of the corrugations, to ensure good metal-to-metal contact at those places. To ensure accurate alignment of the plates 71 during assembly, holes 75 are provided at each end into which dowels locate. The stack of plates 71 and foils 76 is assembled, and the plates 71 are compressed during diffusion bonding, and the plates 71 are thereby sealed to each other. Gas flow plenums 78 are then diffusion bonded onto the stack at each corner, each plenum 78 communicating with one set of header grooves 74.

When it is necessary to replace the catalyst, this may be done by cutting off one set of headers, for example on the plane 66-66, and then extracting the foils 76 from all the channels defined by the grooves 72, and replacing the foils 76. The cut surfaces on the plane 66-66 are then machined accurately flat, re-assembled, and diffusion bonded together again.

Because the plates 71 are diffusion bonded together, the reactor 70 may be used with gas streams whose pressures differ by a large amount. It is also suited to the steam/methane reforming stage (equivalent to catalytic reactor 14) where the pressure difference between the two gas streams is not very high. In this case it may not be necessary to use foils 76 whose corrugations vary along the length of the channel in either of the gas flow channels, so foils 76 with uniform corrugations may be used instead. It will be appreciated that the foils in the two different gas streams would be different, and in particular would differ as to the catalyst. As explained earlier, in a pre-reformer 15 reactor an appropriate catalyst would be nickel; in a reformer 16 an appropriate catalyst would be platinum; while in a combustion channel a suitable catalyst would be platinum. A preferable catalyst in the combustion channel would comprise palladium deposited on a non-sintering ceramic such as magnesium hexaaluminate; it is believed that the palladium forms palladium oxide, which is an effective combustion catalyst up to about 800° C., but above that temperature forms palladium metal which is less effective as a catalyst; the magnesium hexaaluminate acts as a combustion catalyst at temperatures between 800° C. and 900° C. (and does not sinter in this temperature range).

In an alternative, the combustion takes place in an external burner (such as a laminar flow burner), the very hot exhaust gases at about 900 or 1000° C. being passed through the second gas flow channels of the reactor 14 in counter-current to the methane flow. In this case it is not necessary to provide the foils with ceramic coating or catalyst, but the foils enhance heat transfer between the second gas flow channel carrying the hot exhaust gas and the reactants in the pre-reformer and reformer channels, by transferring heat to the separating plates 71.

Figure 4:
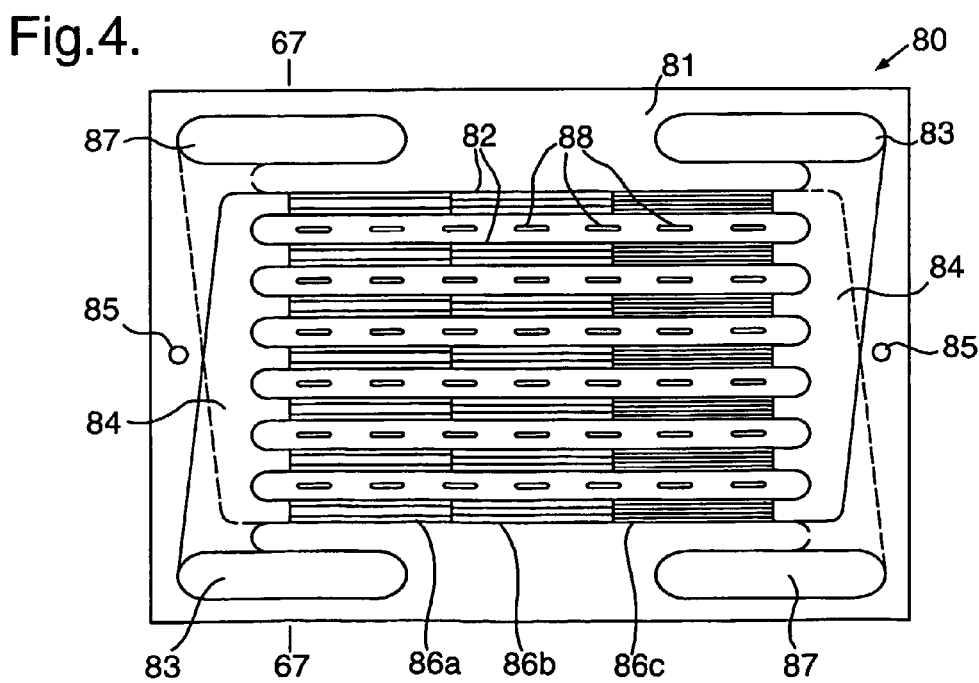
FIG. 4 shows a plan view of a plate which may be stacked to form another alternative catalytic reactor.

Referring now to FIG. 4, an alternative reactor 80 has some similarities to the reactor 70 in comprising a stack of Fecralloy steel plates 81, each plate being generally rectangular, 125 mm long and 90 mm wide and 2 mm thick. Along the centre portion of each plate 81, seven parallel rectangular grooves 82 are machined, each of width 4 mm and depth 0.75 mm, and at a separation of 5 mm, with a header groove 84 of the same depth at each end, the header groove 84 extending to a header aperture 83 near one side edge of the plate 81. On the top surface of the plate 81 shown in the figure the gas flow is therefore from the aperture 83 at the bottom left to the aperture 83 at the top right. The grooves on the opposite surface of the plate 81 are identical but the headers (indicated in broken lines) extend to header apertures 87 near opposite sides of the plate 81. Successive plates 81 have their header grooves 84 in mirror image arrangements, so the adjacent grooves 84 communicate with the same pairs of header apertures 83 or 87. Within each rectangular groove 82 are three corrugated Fecralloy foils 86 *a, b* and *c*, each 50 μm thick and with its corrugations 1.5 mm high, but differing in the pitch or wavelength of their corrugations. To ensure accurate alignment of the plates 81 during assembly, holes 85 are provided at each end into which dowels locate. The stack of plates 81 and foils 86 is assembled, compressed and diffusion bonded together. Gas flow plenum connections are then made to the apertures 83 and 87 at the top of the stack, which are closed at the bottom of the stack. Not only does the reactor 80 differ from the reactor 70 in having integral headers defined by the apertures 83 and 87 (in place of the plenums 78), but in addition seven slots 88 through the plates 81 are defined in each land between the rectangular grooves 82, each slot 82 being 1 mm wide and 6 mm long. After assembly of the stack these slots 88 provide a flow path for a third gas stream, for example for pre-heating a gas stream.

As with the reactor 70, when it is necessary to replace the catalyst this may be done by cutting off one set of headers, for example on the plane 67-67, and then extracting the foils 86 from all the channels defined by the grooves 82, and replacing the foils 86. The cut surfaces on the plane 67-67 are then machined accurately flat, re-assembled, and diffusion bonded together again.

Figure 5A:
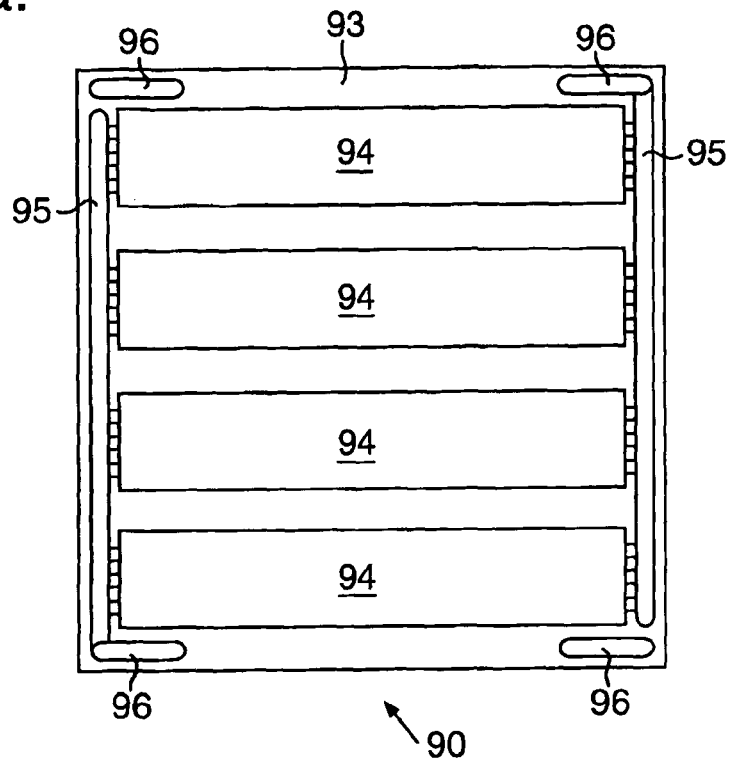
FIGS. 5a and 5b show show plan views of plates used to form another alternative catalytic reactor.
Figure 5B:
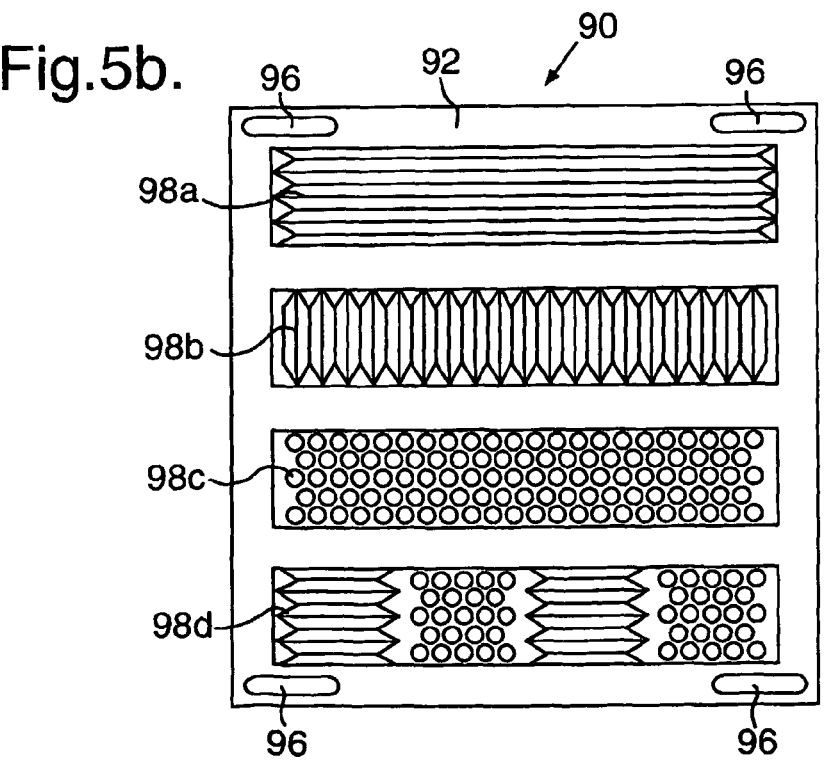

Referring down to FIGS. 5*a* and 5*b*, an alternative reactor 90 comprises a stack of corrugated foils 92 spaced apart by frames 93. Each frame (as shown in FIG. 5*a*) comprises a generally square plate 93 of Fecralloy steel, 60 mm square and 1 mm thick, that defines four rectangular apertures 94 each 50 mm by 10 mm. At each end of the plate 93 is a header groove 95 of depth 0.5 mm communicating via notches with each aperture 94. Near the corners of each plate 93 are header apertures 96. There are two types of frame, which are used alternately in the stack. In one type (as shown) the header grooves 95 communicate with the apertures 96 at the bottom left and top right of the plate 93 (as shown), while in the other type (not shown) the header grooves 95 communicate with the apertures 96 at the top left and bottom right of the plate 93. Each foil 92 (as shown in FIG. 5*b*) is also 60 mm square, and of thickness 0.5 mm. Near each corner it defines header apertures 96. Four rectangular areas 98 (which correspond to the apertures 94) are corrugated with an amplitude of 0.5 mm above and below the plane of the foil. In practice each such area 98 is generally corrugated in the same pattern, but four different patterns are shown: area 98*a* has corrugations extending longitudinally along the flow channel; area 98*b* has corrugations extending transverse to the direction of flow; area 98*c* has dimples; while area 98*d* has both corrugations extending longitudinally and also dimples. The reactor 90 consists of a stack of the foils 92 spaced apart by the two types of frame 93 used alternately, the bottom of the stack comprising a blank square plate (not shown) followed by a frame 93, and the top of the stack comprising a frame 93 covered by a square plate (not shown) that defines apertures corresponding to the apertures 96. The stack is assembled, compressed, and diffusion bonded together.

It will be appreciated that the foils in the channels in the reactors 70 and 80 might be dimpled instead or in addition to being corrugated, as in the reactor 90, and might also be perforated to provide further turbulence and mixing within each channel.

In a further modification, near the exit from the Fisher-Tropsch reactor 26 the foils may have a saw-tooth profile along at least part of the flow channel (i.e. corrugations transverse to the flow direction, the corrugations being of smaller amplitude than the height of the channel), so as to induce vortex flow and to initiate separation of liquid from gas.

In a further modification the plates that resist the pressure difference between the flow channels, e.g. the plates 42 in reactor 40 or the plates 71 in reactor 70, are of a metal such as titanium that can withstand the high temperatures and the pressures and which can be readily diffusion bonded, while the foils e.g. 46 and 76, may be of Fecralloy steel if a ceramic coating (as a catalyst substrate) is required.

In the combustion channels of the catalytic reactor 14, if catalytic combustion is used to generate the heat (as indicated), the combustion catalyst may itself be coated with a thin porous inert ceramic layer, so as to restrict the contact of the gas mixture with the catalyst and so restrict the reaction rate particularly at the start of the channel. In a further alternative the combustion may take place at an elevated pressure.

As mentioned earlier, electrical heating by passing an electric current directly through the plates forming the reactor may be used initially to raise the temperature for example of the catalytic reactor 14 to say 400° C. before supplying gases, to ensure a catalytic combustion occurs. Such electrical heating may also be used during operation to adjust the reactor temperature. Electrical heating may also be used in the vicinity of the outlet from the reactor 14 to ensure that a temperature of say 900° C. is reached by the gases undergoing the reforming reaction.

As mentioned earlier the heat given out in the Fisher-Tropsch synthesis may be transferred using a heat transfer fluid such as DOWTHERM A. This heat transfer fluid is a eutectic mixture of two very stable compounds, biphenyl ($C_{12}H_{10}$) and diphenyl oxide ($C_{12}H_{10}O$), and the pressure in the channels containing this fluid may be such that the fluid remains as a liquid phase, or is allowed to boil.

In the reactor 14 the temperature in the reformer 16 determines the proportions of CO and $CO_2$ in the emerging gases. By ensuring the gas mixture reaches a high temperature, for example 900° C. or above at least near the end of the reformer 16, the proportion of CO is maximised. This temperature profile may for example be obtained by staged addition of methane (possibly with oxygen) to the combustion channel.

The invention claimed is:

1. A catalytic reactor comprising
   a plurality of flat metal sheets arranged in a stack, said sheets being shaped for defining a plurality of side-by-side first fluid flow channels between first adjacent sheets and for defining a plurality of side-by-side second fluid flow channels between second adjacent sheets, said first flow channels alternating with said second flow channels in said stack for providing thermal contact between fluids in said first and second flow channels, said sheets being bonded together for ensuring fluid-tight channels, and such that the fluids in the first and the second fluid flow channels may differ in pressure,
   supply means for supplying fluids to said first and second flow channels, said supply means being such that different fluids can be supplied to said first and second fluid channels; and
   a permeable metal heat-transfer layer within at least each first flow channel, said metal heat-transfer layer being removable and incorporating on at least one surface thereof a catalytic coating, said catalytic coating optionally incorporating a ceramic layer, wherein said catalytic coating is provided only on those surfaces of said heat-transfer layer that do not come into contact with walls of said channel.

2. A catalytic reactor as claimed in claim 1 wherein said first and second flow channels are less than 8 mm deep in the direction normal to said adjacent metal sheets.

3. A catalytic reactor as claimed in claim 1 wherein, within each flow channel, said permeable metal heat-transfer layer incorporates a catalytic coating.

4. A catalytic reactor as claimed in claim 1, said reactor including a header, wherein said permeable metal heat-transfer layers are removable from its respective channel after removal of said header from said reactor.

5. A catalytic reactor as claimed in claim 1 wherein a catalyst metal is deposited directly onto said surface of said permeable metal heat-transfer layer.

6. A catalytic reactor as claimed in claim 1 incorporating electrical heating means for passing an electric current through said sheets.

7. A catalytic reactor as claimed in claim 1 for use in a process in which a liquid product is formed, wherein no catalyst is provided in those parts of said permeable metal heat-transfer layer that will be coated by said liquid product.

8. A plant for processing methane for producing longer chain hydrocarbons, said plant comprising
   a first catalytic reactor for performing steam/methane reforming;
   a second catalytic reactor for performing Fisher-Tropsch synthesis for creating a fluid mixture, each said catalytic reactor comprising a reactor as claimed in claim 1;
   transfer means for transferring products of said first catalytic reactor to said second catalytic reactor, said transfer means incorporating at least one heat exchanger for removing heat from said products; at least one compression means for increasing the pressure of said products; and
   means for condensing liquid components of said fluid mixture resulting from said Fisher-Tropsch synthesis.

9. A catalytic reactor comprising
   a plurality of metal sheets arranged as a stack, said sheets being shaped so as to define a plurality of side-by-side first flow channels between adjacent sheets and to define a plurality of side-by-side second flow channels between adjacent sheets, first flow channels alternating with second flow channels in the stack, and such that there is good thermal contact between fluids in the first and the second flow channels, the sheets being bonded to ensure fluid-tight channels, and such that the fluids in the first and the second fluid flow channels may differ in pressure; and
   supply means for supplying fluids to said flow channels, said supply means enabling different fluids to be supplied to said first and second flow channels;
   wherein permeable metal heat-transfer layers are provided within said first flow channels, said metal heat-transfer layers being removable and incorporating a catalytic coating comprising a combustion catalyst for causing combustion of a gas mixture flowing in said first flow channels,
   wherein each first flow channel encloses one of said metal heat-transfer layers that incorporate a combustion catalyst,
   wherein each metal heat-transfer layer has a structure that is permeable to the gas flow along the first flow channel, and
   wherein said combustion catalyst in at least a first part of said channel is coated with a porous inert ceramic layer for restricting a reaction rate of said combustion.

10. A catalytic reactor as claimed in claim 9 wherein both said first and said second flow channels are less than 8 mm deep in the direction normal to said adjacent metal sheets.

11. A catalytic reactor as claimed in claim 9 wherein removable metal heat-transfer layers are provided in both said first and said second flow channels, each such metal heat transfer layer comprising a corrugated metal foil.

12. A catalytic reactor as claimed in claim 11 wherein in at least one of said flow channels the pitch of said corrugated foil varies along the length of said channel.

13. A catalytic reactor as claimed in claim 9 wherein the flow direction of said first flow channels is transverse to the flow direction of said second flow channels.

14. A catalytic reactor as claimed in claim 11 wherein the flow direction of the first flow channels is transverse to the flow direction of said second flow channels.

15. A catalytic reactor as claimed in claim 9 for performing methane/steam reforming, wherein removable metal heat-transfer layers are provided in both said first and said second flow channels, said permeable metal heat-transfer layers within said second flow channels incorporating a catalyst for methane/steam reforming.

16. A catalytic reactor comprising
   a plurality of flat metal sheets arranged in a stack, wherein said stack comprises a first sheet, a second sheet, and a third sheet, wherein said first sheet and said second sheet define a plurality of fluid tight first flow channels therebetween, wherein said second sheet and said third sheet define a plurality of fluid tight second flow channels therebetween, wherein said metal sheets arranged in the said stack are bonded together;
   headers for supplying fluids to said first and second flow channels, wherein said headers are capable of supplying different fluids to said first and second flow channels; and
   a permeable and removable metal heat-transfer layer within at least each first flow channel, wherein said metal heat-transfer layer comprises a catalytic coating on at least one surface thereof, wherein said catalytic coating is not provided on any surface of said heat-transfer layer that comes into contact with walls of the respective first flow channel.

17. A catalytic reactor as claimed in claim 16 wherein grooves in at least said first sheet define said first flow channels.

18. A catalytic reactor as claimed in claim 16 wherein said catalytic coating comprises a ceramic layer.

19. A catalytic reactor as claimed in claim 16 wherein both said first flow channels and said second flow channels are less than 8 mm deep in the direction normal to said metal sheets arranged in said stack.

20. A catalytic reactor as claimed in claim 16 for performing methane/steam reforming, wherein a permeable and removable heat-transfer layer is provided in said second flow channels, wherein said heat-transfer layer in the said first flow channels comprises a catalyst for combustion, wherein said heat-transfer layer in said second flow channels comprises a catalyst for methane/steam reforming.

* * * * *